(No Model.) 2 Sheets—Sheet 1.
R. J. BROWN & J. E. REGISTER.
COMBINED COTTON CHOPPER AND CULTIVATOR.
No. 529,061. Patented Nov. 13, 1894.
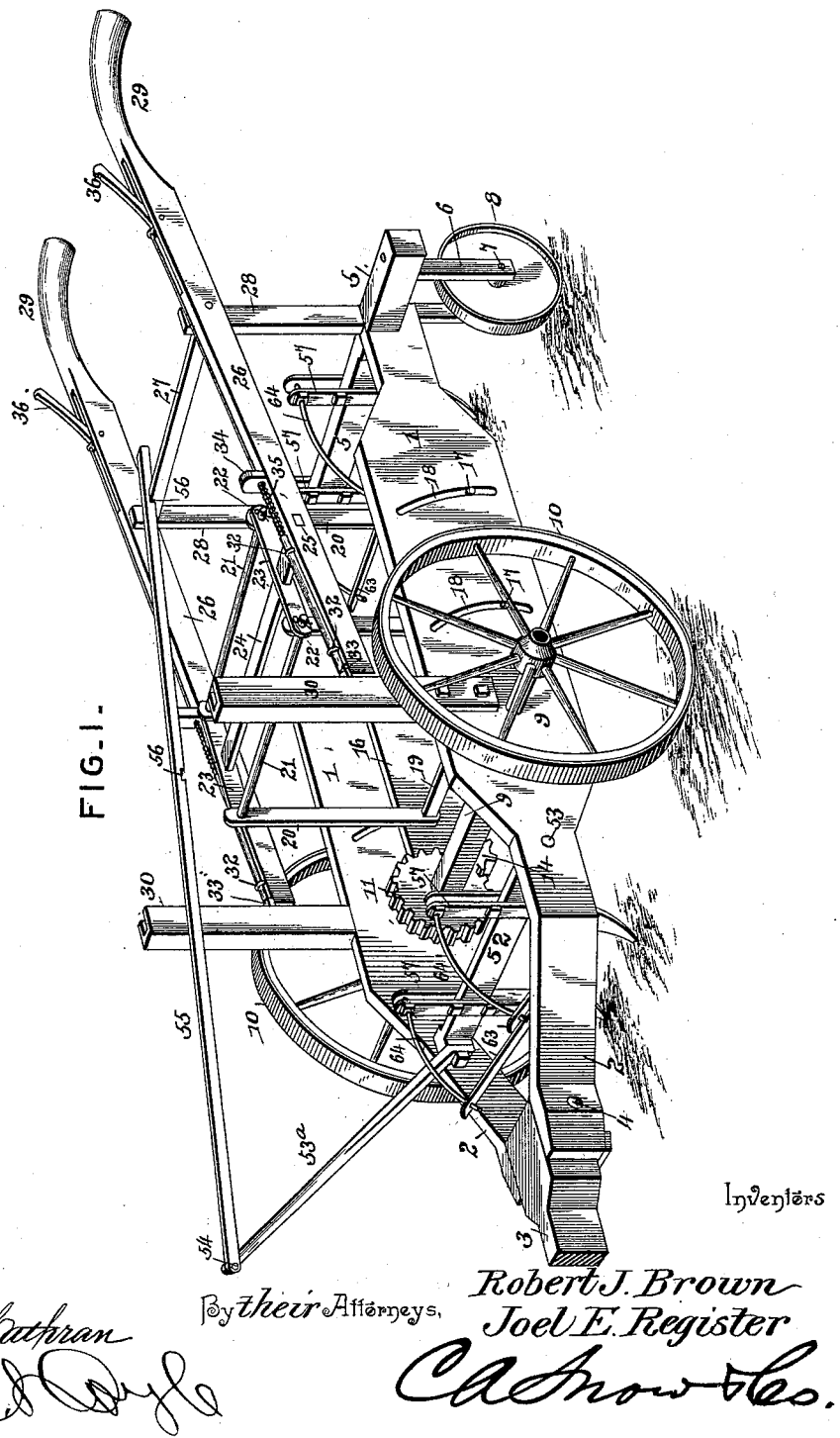
Witnesses
Jas. K. McCathran
By their Attorneys,
Inventors
Robert J. Brown
Joel E. Register (No Model.) 2 Sheets—Sheet 2.
R. J. BROWN & J. E. REGISTER.
COMBINED COTTON CHOPPER AND CULTIVATOR.
No. 529,061. Patented Nov. 13, 1894.
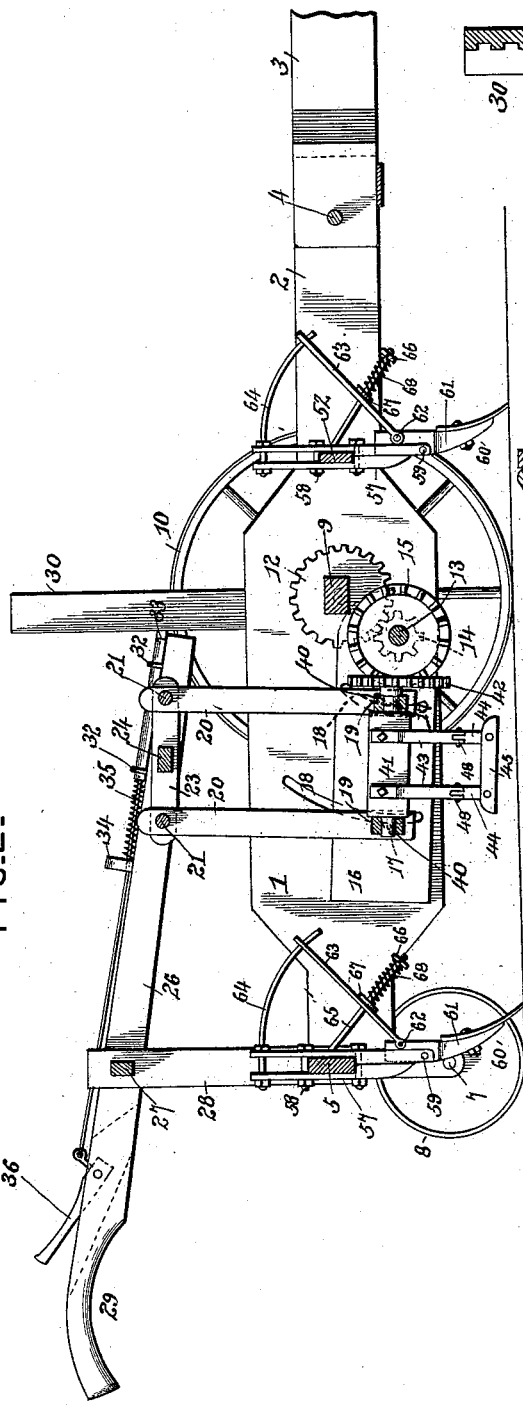
Inventors
Robert J. Brown
Joel E. Register
Witnesses
By their Attorneys

UNITED STATES PATENT OFFICE.

ROBERT J. BROWN AND JOEL E. REGISTER, OF LOGANSPORT, LOUISIANA.

COMBINED COTTON CHOPPER AND CULTIVATOR.

SPECIFICATION forming part of Letters Patent No. 529,061, dated November 13, 1894.

Application filed March 15, 1894. Serial No. 503,740. (No model.)

*To all whom it may concern:*

Be it known that we, ROBERT J. BROWN and JOEL E. REGISTER, citizens of the United States, residing at Logansport, in the parish of De Soto and State of Louisiana, have invented a new and useful Combined Cotton Chopper and Cultivator, of which the following is a specification.

Our invention relates to improvements in cotton-choppers; the objects in view being to produce a machine of cheap and simple construction, the same being designed effectually to chop out and bring to stands growing cotton, and simultaneously therewith to form the same into rows; furthermore to construct the machine so as to permit the same to be used solely as a cultivator when desired; and finally to construct the plows in such a manner as to prevent them from becoming broken by contact with bowlders, stumps, and other material obstructions, and likewise to construct the chopping-knife or knives so as to fulfill a similar object.

With these and various other objects in view our invention consists in certain features of construction hereinafter specified and particularly pointed out in the claims.

Referring to the drawings:—Figure 1 is a perspective view of a cotton-chopper machine embodying our invention. Fig. 2 is a vertical longitudinal sectional view of the same through the center of the machine. Fig. 3 is a perspective view in detail of the chopper. Fig. 4 is a detail in section of one of the plows. Fig. 5 is a transverse sectional view through one of the knife-carrying standards, and its shaft. Fig. 6 is a vertical sectional view through one of the adjusting posts, for the handle-levers.

Like numerals of reference indicate like parts in all the figures of the drawings.

In the practice of our invention we employ two opposite side-beams 1, extending lengthwise of the machine, said side-beams being widened at their intermediate portions and reduced toward their ends. The front portions of the side-beams converge as shown at 2, and embrace the draft-beam 3, which is centrally located and pivoted between the front ends of the side-beams by a transverse bolt 4. The rear ends of the side beams have let therein and are surmounted by a transverse beam 5, whose extremities project beyond the side-beams and are provided with depending standards 6, from whose lower ends there extend inward short axles 7 for the accommodation of rear ground-wheels 8. Bearings are formed in the side-beams 1 immediately in rear of their converged portions, and in said bearings there is journaled a transverse rotatable axle 9, whose extremities beyond the side-beams have made fast thereon main ground-wheels 10. Between its bearings the axle 10 is squared and has located thereon a pair of spur-gears 11 and 12 arranged at opposite sides of the machine.

Immediately in rear of the axle we journal in the side beams 1, a transverse shaft 13, and the same has mounted rigidly thereon small spur-gears 14, and a facial-gear 15, the small spur-gears mentioned being engaged and driven by spur-gears 11 and 12 of the axle as the latter rotates.

Hung loosely on the transverse shaft 13 are the opposite frame-bars 16, which are located at the inner sides of the beams 1, and said frame-bars are each provided with a pair of outwardly extending trunnions or pins 17 which are designed to move in curved slots 18 which are formed in the beams 1 and arranged concentrically with the aforesaid shaft 13, so that with any movement of the frame-bars the trunnions or pins 17 serve to guide the same. These frame-bars 16 are connected by intermediate transverse front and rear frame-bars 19, from which rise at opposite ends vertical standards 20, the same being connected at their upper ends by transverse tie-rods 21 which pass through openings in the standards 20, and beyond the same are perforated to receive linch-pins 22. The extremities of these rods 21 are connected by short longitudinal bars 23, and they in turn are at their centers connected by a transverse bar 24. The bars 24 have their outer ends beyond the bars 23 let into mortises 25 formed in a pair of opposite handle-levers 26, which near their rear ends are fulcrumed on a transverse bearing-bar 27 which is mounted in the upper ends of a pair of rear vertical standards 28 that rise from the cross-bar 5 of the main framework. Beyond these standards 28 the handle-levers are shaped to form hand-grips 29, to accommodate the hands of the operator, who it will be understood follows the machine during its operation. In front of the ends of the handle-levers 26 there is located a pair of vertical locking-standards or posts 30, the same having their rear faces channeled as shown and provided with a series of transverse teeth 31. Pairs of keepers 32, are located upon the upper sides of the before mentioned handle-levers, and arranged in said keepers for reciprocation is a pair of locking-pawls or bolts 33, whose front ends are designed to engage with any one of the teeth 31. The rear ends of these bolts are reduced and passed through perforations formed in guide-lugs 34, and located on the reduced portions and interposed between the enlarged portions of the bolts and aforesaid guides 34, are coiled-springs 35, the tendency of which is to force the bolts 33 forward so as to normally engage suitable teeth in the locking-posts or standards 30. Thumb-levers 36 are pivoted in channels formed in the upper sides of the handle-levers adjacent to the grip-portions 29 thereof, the said thumb-levers being of the bell-crank pattern and having their forward branches connected by wires 39 with the rear reduced ends of the bolts 33.

In the front and rear transverse bars 19 at the centers thereof, we form longitudinally opposite bearings 40, and we journal in said bearings a longitudinally disposed rotatable hoe-shaft 41. The front end of this shaft, which projects beyond the front bearings 40, is provided with a spur-gear 42 whose teeth engage with those of the facial gear 15. This hoe-shaft may carry one or a plurality of hoes as desired, but regardless of the number carried thereby, we prefer that each hoe should be constructed as follows:—A pair of hollow arms 43 project from the shaft and have pivoted in rule-joint fashion to their outer extremities a pair of extensions 44, which are connected by a transverse hoe-blade 45. The rear faces of the extensions 44 are chambered and have pivoted therein by transverse pins 46, rods 47, which extend beyond the rule-joints 48 of the hoe-carrying arms and are pivoted at 49 to rods 50, which extend and loosely rest in the hollow hoe-carrying arms 43. Coiled-springs 51 are arranged on the rods 50 and by their expansive tendency serve to maintain the arms 43 and their extensions 44 in alignment and the hoe-blade in a position to cut or chop when brought forcibly into contact with the cotton.

It will be obvious that if at any time the hoe-blade should come into contact with a bowlder, rock, stump or other material obstruction the coiled springs yielding to the abnormal pressure will permit of the extensions 44 swinging backwardly or contrary to the direction of revolution, and hence permit said hoes to glide over the obstructions so as not to become broken by resisting the same.

Motion is imparted to the hoe-shaft, it will be understood, from the axle, in that as the latter revolves during the travel of the machine its two spur-gears 11 and 12 will actuate the two smaller spur-gears 14, which rotate the shaft 13 and impart motion to the facial-gear 15, the latter in turn driving the spur-gear 42 of the hoe-carrying shaft. The hoe-carrying shaft, it will be seen, is mounted in the swinging frame-work constructed for the purpose and may be raised and lowered through the medium of the handle-levers 26. In raising and lowering the handle-levers the operator operates the thumb-levers 36 so as first to disengage the bolts 33 from the teeth of the locking-posts or standards 30, then bearing upon the levers or releasing the same, the hoe-frame will be elevated or lowered to a desired position with relation to the surface of the ground and hence a uniform depth of chopping may always be secured. Furthermore, when it is desired to throw the chopping mechanism out of operation this may be done, and in any position the chopping-frame may be adjusted to, it will be locked by the bolts 33 engaging with the toothed locking-posts or standards 30.

As a matter of fact, any kind or style of plow may be employed in connection with our chopping machine, though we have devised and herein shown a preferred construction, in that by reason of such construction we secure benefits and advantages that will at once be appreciated by those skilled in this class of machines. Such plow, as we shall proceed to describe farther on, we locate in pairs, two on the rear cross-bar 5, and two on the rock-shaft 52 located at the front of the machine and having its ends journaled in transversely opposite bearings 53 formed in the beams 1 in advance of the ground-wheels 10. This rock-shaft has extending upwardly from it, an inclined rod 53ª, and pivoted at 54 to the upper end of said rod is an operating-lever or bar 55. This bar has front and rear notches 56 formed in its under side, and inasmuch as it rests upon the transverse fulcrum-bar 27 of the handle-levers, it is within easy grasp of the operator following after the machine. By drawing the bar rearward or forcing the same upward, the shaft 52 may be caused to occupy different positions, in either one of which it may be locked by the notches 56 engaging with the fulcrum-bar 27. In this manner the plows carried by said bar may be swung into operative position or elevated from such position, the latter operation being desirable when the machine is being turned at the end of the field. Inasmuch as all of the plows are similarly constructed a description of one will suffice for all. At the front and rear sides of the supporting-shaft or bar, as the case may be, we arrange sectional clamping-standards 57, securing the same together by bolts 58. The lower end of the front standard is bifurcated and has pivoted within its bifurcations at 59, plow-feet 60, upon which the shovels or plows are secured. The plow-feet it will be observed are reduced to form shanks 61 which take between the bifurcations and have pivoted to their upper ends at 62 the lower ends of bars 63. The upper ends of these bars are perforated and receive loosely curved spring-rods 64 which extend forward from the upper ends of the sectional standards 57. It will be seen that the tendency of these spring-rods is to maintain the feet 60 in alignment with the plow standards and that any tendency of the feet to work upon their pivots will be resisted by the tensile strength of the rods 64. The nearer the upper ends of the bars 63 are to the extremities of the spring-rods, the less will be the resistance to the feet swinging forward or yielding to obstructions that may lie in the path of the plows. To provide for a proper adjustment of these feet so as to offer suitable resistance to ordinary obstructions, we connect to the front section of each standard a rod 65, the same being inclined and passing through the upper end of the bifurcation of the bar 63 and beyond the same, where it terminates in a nut 66 that is adjustable on the rod. The rod has furthermore mounted thereon a follower-block 67, and a coiled-spring 68 is interposed between the outer face of the follower-block and the nut 66. By adjusting the nut 66 against the tension of the coiled-spring 68, the bar 63 is yieldingly held at a proper point upon the curved spring-rod and yet not in such manner as to actually prevent any possible movement upon the part of the spring-bars in case the plow-foot should meet with a material obstruction.

This completes the construction of the machine and the operation thereof, having been in part described, in general, consists as follows:—The machine moving along over a field of cotton, the front plows serve to form furrows, thus producing rows, similar to the ordinary cotton-plow. The rotatable hoes will at intervals chop out spaces transverse to the rows and between the same so that the cotton is brought to a stand. The rear plows follow immediately after the front plows but slightly to one side thereof and they serve to increase the width of the rows and to throw up the dirt around the roots of the stand produced by the combined action of the front plows and the revolving hoes.

It will be seen from the foregoing description that the machine is of cheap and simple construction, that the same may be employed either as a cotton-chopper or simply as a cultivator, that the parts are all adjustable, are simply constructed and each designed and constructed so as to resist wear and accidental breakage by contact with any material obstructions.

We do not limit our invention to the precise details of construction herein shown and described, but hold that we may vary the same to any degree and extent within the knowledge of the skilled mechanic.

Having described our invention, what we claim is—

1. The combination with a transverse support, of a plow standard secured thereto and having its lower end bifurcated, a plow-foot reduced at its upper end located in the bifurcation and pivoted, a bifurcated bar pivoted to and embracing the shank of the foot and having a perforation at its upper end, a curved spring-rod extending from the standard through the perforation in the bar, a rod extending from the standard through the bifurcation in the bar and beyond the same, a follower arranged on the rod, a nut arranged on the rod beyond the follower, and a coiled-spring arranged between the nut and the follower, substantially as specified.

2. The combination with a support, of a standard depending therefrom, a curved spring-rod projecting forward and downward from the standard at the upper end thereof, a foot pivoted in the lower end of the standard and carrying a plow, a bar pivoted to the upper end of the foot beyond its pivot points with said standard, said bar having a perforation in its upper end which loosely receives the spring-rod, substantially as specified.

3. In a cotton-chopper the combination with a framework, the rotatable shaft and means for operating the same, of a pair of hoe-arms extending from the shaft, extensions connected to the extremities of the same by a rule-joint, a hoe connecting the extensions, rods pivoted in the extensions, rods located in the arms and pivoted at their ends to the ends of the rods in the extensions, and coiled-springs located upon those rods in the arms, substantially as specified.

4. In a cotton-chopper, the combination with the framework, the axle, the supporting-wheels and plows, of a hoe-carrying frame hung in the framework, means for raising and lowering said frame and transmitting motion from the axle to the hoe-shaft therein, and guide-pins extending from the sides of the frame and engaging with curved slots formed in the sides of the main-frame, substantially as specified.

5. In a cotton-chopper, the combination with the main-frame, the axle, the ground-wheels, the standards at the rear end of the main frame, and a transverse fulcrum-bar connecting the same, the toothed locking-posts arranged on the side-bars of the main-frame, a transverse shaft journaled in the main-frame, gearing between the same and the axle, a hoe-carrying shaft loosely hung upon the transverse shaft, means for communicating motion from the transverse shaft to the hoe-carrying shaft, suspension-devices rising from the hoe-carrying frame, handle-levers fulcrumed on the fulcrum-bar and connected to the suspension-devices, bolts arranged upon the handle-levers and adapted to engage with the teeth of the locking-posts, substantially as specified.

6. In a cotton-chopper, the combination with the rectangular main-frame, the transverse axle, and the ground-wheels thereon, of a shaft journaled in the main-frame, gearing between the same and the axle, opposite side-bars hung upon the shaft and connected by transverse bars, a hoe-carrying shaft journaled in the transverse bars and a gear at the front end of the same meshing with gearing on the transverse shaft, standards rising from the transverse bars, tie-rods connecting the standards, cross-bars connecting the tie-rods, a bar connecting the cross-bars and extending beyond the same, a pair of handle-levers connected to the ends of the bar, a rear fulcrum-bar supported on the main-frame, upon which the handle-levers are fulcrumed, locking-standards at the front ends of the handle-levers arranged upon the main-frame and having their rear faces toothed, reciprocating bolts for engaging the teeth arranged upon the handle-levers, springs for actuating the same, thumb-levers fulcrumed on the handle-levers, and wires between the thumb-levers and the bolts, substantially as specified.

7. In a cotton-chopper the combination with the main-frame, having a rear fulcrum, a pair of levers fulcrumed thereon, and means for locking the front ends of the levers, of a suspension-frame carried by the levers, a cotton chopping mechanism supported by the suspension-frame, a transverse axle, ground-wheels, and means for communicating motion from the axle to the chopping-mechanism, substantially as specified.

In testimony that we claim the foregoing as our own we have hereto affixed our signatures in the presence of two witnesses.

ROBERT J. BROWN.
JOEL E. REGISTER.

Witnesses:
J. W. BILLINGSLY,
A. M. GARRETT.